United States Patent
Ueda et al.

(10) Patent No.: US 7,548,410 B2
(45) Date of Patent: Jun. 16, 2009

(54) CAPACITOR AND MANUFACTURING METHOD OF THE SAME

(75) Inventors: Akira Ueda, Sannohe (JP); Ichirou Yamaji, Sannohe (JP); Katsuharu Yamada, Sannohe (JP); Minoru Funahashi, Sannohe (JP); Junkichi Mabe, Sannohe (JP); Ryoichi Kozaki, Yokohama (JP)

(73) Assignee: Nichicon Corporation, Kyoto (JP)

( * ) Notice: Subject to any disclaimer, the term of this patent is extended or adjusted under 35 U.S.C. 154(b) by 11 days.

(21) Appl. No.: 11/652,142

(22) Filed: Jan. 11, 2007

(65) Prior Publication Data

US 2008/0043403 A1    Feb. 21, 2008

(30) Foreign Application Priority Data

Jan. 12, 2006    (JP)    ............................. 2006-005440

(51) Int. Cl.
*H01G 4/228*    (2006.01)
*H01G 9/00*    (2006.01)

(52) U.S. Cl. ...................... 361/540; 361/520; 29/25.03

(58) Field of Classification Search ................. 361/517, 361/519–521, 535, 537–538, 536, 518; 29/25.03
See application file for complete search history.

(56) References Cited

U.S. PATENT DOCUMENTS 2,274,327 A * 2/1942 Georgiev et al. ............ 361/521
3,091,656 A * 5/1963 Lamoureaux, Jr. .......... 174/551
3,356,913 A * 12/1967 Earley ......................... 361/520
3,686,536 A * 8/1972 Pearce et al. ................ 361/520

FOREIGN PATENT DOCUMENTS

| | | |
|---|---|---|
| JP | 6-310388 A | 11/1994 |
| JP | 11-3840 | 1/1999 |
| JP | 2000-114118 A | 4/2000 |
| JP | 2001-230160 A | 8/2001 |
| JP | 2001-284175 A | 10/2001 |
| JP | 2001326143 A * | 11/2001 |

* cited by examiner

*Primary Examiner*—Eric Thomas
(74) *Attorney, Agent, or Firm*—Arent Fox LLP (57) ABSTRACT

A capacitor has a capacitor element, a packaging material, and a sealing material. The capacitor element has an anode foil coupled to an anode terminal, a cathode foil coupled to a cathode terminal, a separator, and an electrolyte layer. The anode foil, the cathode foil and the separator are rolled together. The separator is between the anode foil and the cathode foil. The electrolyte layer is formed between the anode foil and the cathode foil. The packaging material has an opening and packages the capacitor element. The sealing material has a through hole where the anode terminal and the cathode terminal pass through and seals the opening of the packaging material. A given space is provided between the sealing material and the capacitor element. A stopper for securing the space is provided on at least one of the anode terminal and the cathode terminal.

10 Claims, 8 Drawing Sheets

ELECTROLYTIC SOLUTION

FIG. 4A

MONOMER
OXIDIZING REAGENT

CURLING

DRAWING

CAPACITOR AND MANUFACTURING METHOD OF THE SAME

BACKGROUND OF THE INVENTION

1. Field of the Invention

This invention generally relates to a capacitor used in an electronic device and a manufacturing method of the same.

2. Description of the Related Art

Recently, there are demands for enhancing capacitance of a capacitor, for downsizing the capacitor, for lowering electrical power consumption of the capacitor and for lowering impedance at high frequencies of the capacitor, as electronics devices are digitalized. A roll-formed electrolytic capacitor is known. The capacitor has a structure in which a capacitor element is packaged in a case such as aluminum case or a resin case having a cylindrical shape and having a bottom, and an opening of the case is sealed.

Japanese Patent Application Publication No. 2000-114118 (hereinafter referred to as Document 1) and Japanese Patent Application Publication No. 11-3840 (hereinafter referred to as Document 2) disclose a method of putting an epoxy resin or a method of resistance welding with use of an airtight metal, as the sealing method. And the opening is sealed with a sealing material such as a rubber, because the rubber is inexpensive, has sealing activity and has humidity resistance.

It is necessary to reduce a leakage current from the capacitor as much as possible, because there is a demand for lowering the electrical power consumption of the capacitor. And so, a tab terminal is welded to the electrode foil and a rolled element is energized in an electrolytic solution. The electrode foil and the tab terminal are subjected to a chemical conversion treatment. And the leakage current is reduced. Japanese Patent Application Publication NO. 2001-284175 (hereinafter referred to as Document 3) discloses a method of coating an insulating resin to the tab terminal.

However, a load intends to be applied to the terminal when the resin is enclosed or the resistance welding is processed, in accordance with the arts of Document 1 and Document 2. Effect of coated layer is reduced because the sealing material limits impregnation of the electrolytic solution to the electrode foil and the terminal, when a chemical coated layer is formed on the electrode foil and the terminal. And a pressure applied to the electrode foil and the terminal breaks the chemically treated layer when the sealing material is put into, in a case where the sealing material is put into after the coated layer is formed. And it is possible that the leakage current is increased. The same goes for the art of Document 3.

There is a case where the capacitor is subjected to a heat of more than 200 degrees C. as in the case of soldering reflow for few seconds to few minutes. In this case, it is possible that the leakage current is increased and defective appearance is brought about by the deformation of the sealing material, because the inner pressure is increased by the decomposition of the electrolyte and a pressure is applied to the element by the expansion of the sealing material.

SUMMARY OF THE INVENTION

The present invention provides a capacitor limiting an increase of leakage current.

According to an aspect of the present invention, preferably, there is provided a capacitor including a capacitor element, a packaging material, and a sealing material. The capacitor element has an anode foil coupled to an anode terminal, a cathode foil coupled to a cathode terminal, a separator, and an electrolyte layer. The anode foil, the cathode foil and the separator are rolled together. The separator is between the anode foil and the cathode foil. The electrolyte layer is formed between the anode foil and the cathode foil. The packaging material has an opening and packages the capacitor element. The sealing material has a through hole where the anode terminal and the cathode terminal pass through and seals the opening of the packaging material. A given space is provided between the sealing material and the capacitor element. A stopper for securing the space is provided on at least one of the anode terminal and the cathode terminal.

With the above-mentioned configuration, the space provided between the sealing material and the capacitor element can absorb the expansion of the sealing material caused by a thermal load. And it is possible to restrain the contact of the sealing material and the capacitor element effectively because the stopper is provided. And it is possible to restrain that the capacitor element is subjected to a stress from the sealing material. And it is possible to restrain a break of the edge portion of the anode foil. And the space between the sealing material and the capacitor element absorbs the inner pressure increased because of the vaporization of the solvent remaining in the capacitor element. In this case, it is possible to limit the deformation of the sealing material. And it is possible to limit the increase of the leakage current of the capacitor and defective appearance caused by the deformation of the sealing material.

According to an aspect of the present invention, preferably, there is provided a manufacturing method. The method includes rolling an anode foil coupled to an anode terminal, a cathode foil coupled to a cathode terminal and a separator together, inserting the anode terminal and the cathode terminal into a sealing material, providing a given space between the sealing material and the anode and the cathode terminals, subjecting the anode terminal, the anode foil, the cathode terminal and the cathode foil to a chemical conversion treatment, forming an electrolyte layer between the anode foil and the cathode foil and thus fabricating the capacitor element, packaging the capacitor element in a packaging material having an opening, and sealing the opening with the sealing material. The separator is between the anode foil and the cathode foil. A stopper for securing the space is provided on at least one of the anode terminal and the cathode terminal.

With the above-mentioned configuration, the anode foil, the cathode foil and the separator are rolled together. The anode terminal and the cathode terminal are inserted into the sealing material. The space is provided between the sealing material and each electrode foil. The anode terminal, the anode foil, the cathode terminal and the cathode foil are subjected to a chemical conversion treatment. The electrolyte layer is formed between the anode foil and the cathode foil and thus the capacitor element is fabricated. The capacitor element is packaged in the packaging material and the opening is sealed with the sealing material. In this case, an oxide layer is formed on the metal exposed on an end surface (the edge portion) or on an exposed metal surface caused by a chip because of the terminal connection of the anode foil. And it is possible to put the electrolytic solution to the anode terminal sufficiently, because the space is provided between the sealing material and each electrode foil. And it is possible to form an oxide layer on the surface of the anode terminal. Therefore it is possible to limit the increase of the leakage current of the capacitor.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1A:
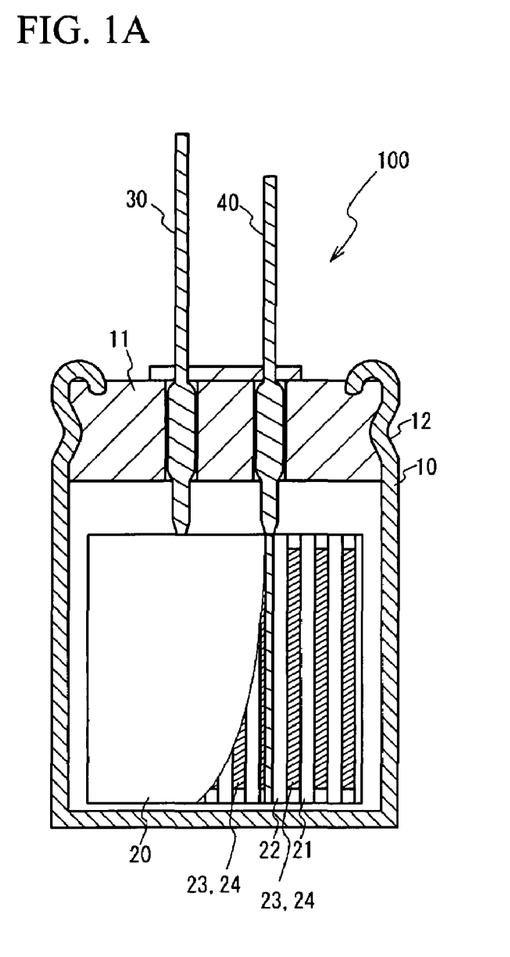
FIG. 1A and FIG. 1B illustrate a roll formed capacitor in accordance with a first embodiment of the present invention.
Figure 1B:
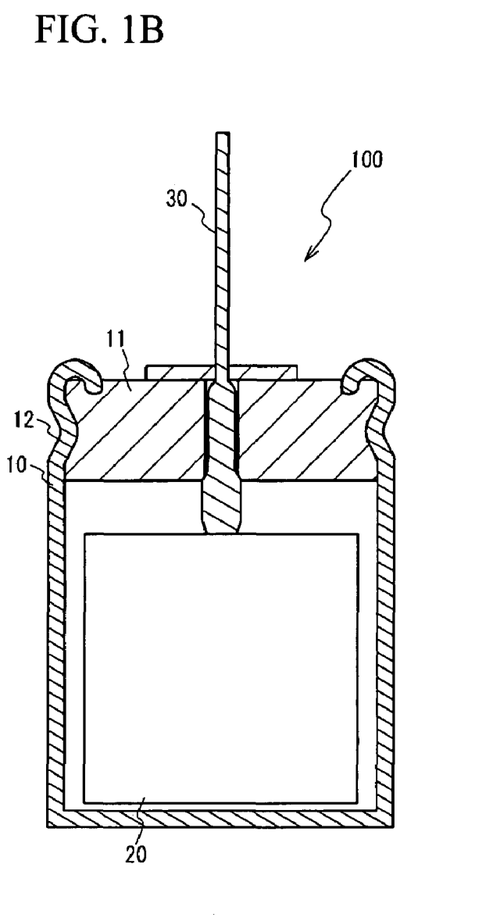

FIG. 1A and FIG. 1B illustrate a roll formed capacitor 100 in accordance with a first embodiment of the present invention. FIG. 1A and FIG. 1B illustrate a partially cutout cross sectional view of the capacitor 100. FIG. 1A illustrates a front view of the capacitor 100. FIG. 1B illustrates a side view of the capacitor 100. As shown in FIG. 1A and FIG. 1B, the capacitor 100 has a structure in which a capacitor element 20 is packaged in a metal case 10. The metal case 10 has a cylindrical shape and has a bottom.

The capacitor element 20 is a cylindrical capacitor element, in which an anode foil 21, a cathode foil 22 and a separator 23 are rolled together, the separator 23 being between the anode foil 21 and the cathode foil 22. An electrolyte layer 24 is formed between the anode foil 21 and the separator 23 and is formed between the cathode foil 22 and the separator 23. The anode foil 21 and the cathode foil 22 are composed of a metal such as aluminum, tantalum, niobium, or titanium. The cathode foil 22 may be composed of a metal as same as that of the anode foil 21. The cathode foil 22 may be composed of a metal material having a valve metal deposited on the surface thereof or a metal material having a carbon absorbed to the surface thereof. In the embodiment, the anode foil 21 and the cathode foil 22 are composed of an aluminum having a dielectric oxide layer formed on the surface thereof.

The separator 23 may be a cellulose electrolytic paper mainly formed of manila hemp or may be a nonwoven fabric mainly formed of such as acrylic resin, polyethylene terephthalate (PET). The separator 23 may be a mixture of the nonwoven and the cellulose electrolytic paper. In the embodiment, the separator 23 is composed of an electrolytic paper mainly formed of manila hemp. In this case, it is possible to fill the separator 23 with an electrolyte, because the manila hemp is carbonized in a thermal treatment in a chemical conversion treatment and a density of the manila hemp is reduced.

The electrolyte layer 24 may be an electrolytic solution in which a carboxylic acid is solved in a solvent such as water or may be a complex salt such as TCNQ complex. In the embodiment, the electrolyte layer 24 may be composed of a conductive polymer that has a low resistance and is stable in a high temperature condition. The conductive polymer may be a polymer of polyethylene dioxythiophene or the like. In this case, a resistivity and ESR of the capacitor 100 is reduced.

The capacitor element 20 has an anode terminal 30 and a cathode terminal 40 acting as electrode extracting portion. The anode terminal 30 is coupled to the anode foil 21. The cathode terminal 40 is coupled to the cathode foil 22. A description will be given later of the anode terminal 30 and the cathode terminal 40.

The metal case 10 is composed of a metal material that can be formed into a cylinder having a bottom. In the embodiment, the metal case 10 is composed of aluminum that is inexpensive and can be processed easily. A concave portion 12 is formed along a circumference near an opening of the metal case 10. The opening of the metal case 10 is filled with a sealing material 11. The sealing material 11 is fixed by the concave portion 12. The metal case 10 is sealed with the sealing material 11. Two through holes are formed in the sealing material 11. The anode terminal 30 passes through one of the through holes, and the cathode terminal 40 passes through the other. And the anode terminal 30 and the cathode terminal 40 are extracted outside of the metal case 10.

The sealing material 11 may be composed of a metal that can be resistance-welded with the metal case 10 or may be composed of epoxy resin or the like being formed easily. In the embodiment, a rubber is used as the sealing material 11. In this case, a drawing process or a curling process is possible and airtightness of the sealing material 11 is secured. The rubber may be a rubber composed of isobutylene-isopropylene copolymer (IIR), ethylene-propylene copolymer (EPT), or a blend of the IIR and the EPT.

Airspace of approximately 1.0 mm to 3.0 mm is provided between the sealing material 11 and the capacitor element 20. In this case, it is possible to absorb an expansion of the sealing material 11 caused by a thermal load or the like. And it is possible to restrain that the sealing material 11 presses the capacitor element 20. It is therefore possible to restrain that a defect is formed in a dielectric oxide layer at an edge portion of the anode foil 21. The airspace between the sealing material 11 and the capacitor element 20 absorbs an inner pressure caused by a vaporization of a solvent remaining in the capacitor element 20. In this case, it is possible to restrain a deformation of the sealing material 11. And it is possible to limit an increase of a leakage current of the capacitor 100.

Figure 2A:
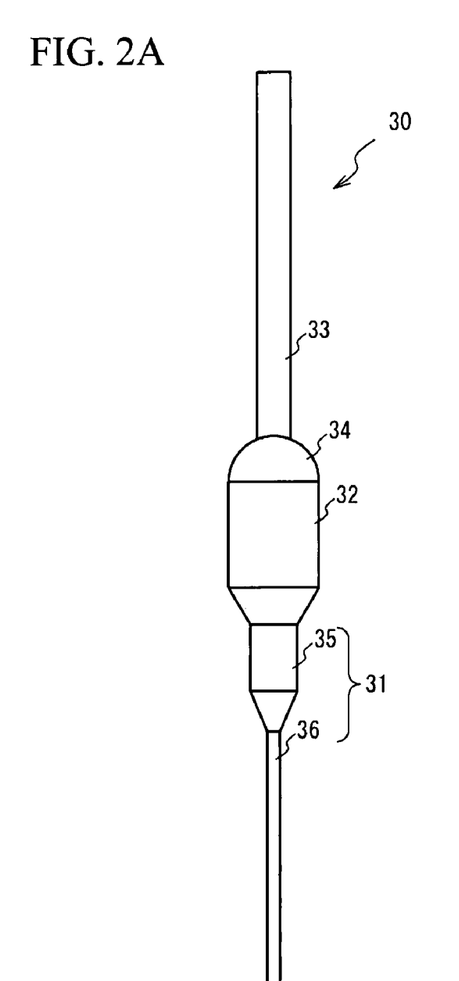
FIG. 2A through FIG. 2D illustrate details of an anode terminal.
Figure 2B:
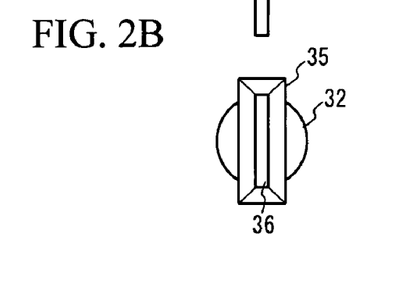
Figure 2C:
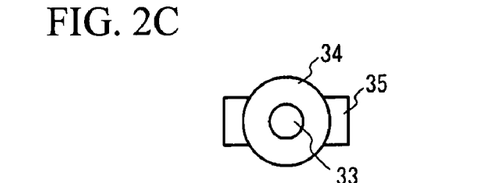
Figure 2D:
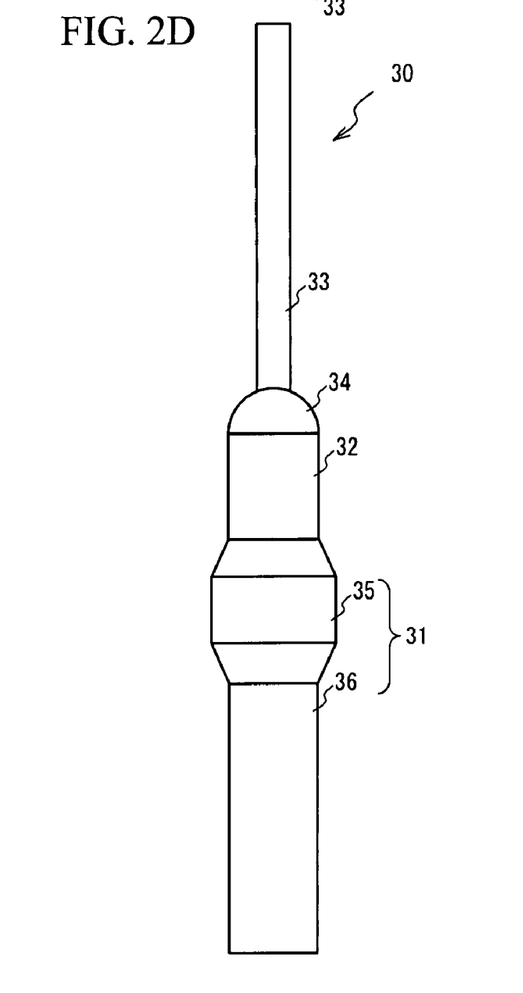

Next, a description will be given of the anode terminal 30, with reference to FIG. 1A, FIG. 1B and FIG. 2A through FIG. 2D. FIG. 2A through FIG. 2D illustrate details of the anode terminal 30. FIG. 2A illustrates a side view of the anode terminal 30. FIG. 2B illustrates a bottom view of the anode terminal 30 viewing from a reduced portion 31 side. FIG. 2C illustrates a top view of the anode terminal 30 viewing from a lead portion 33 side. FIG. 2D illustrates a front view of the anode terminal 30.

As shown in FIG. 2A and FIG. 2D, the anode terminal 30 has a tab terminal structure. In detail, the anode terminal 30 has the reduced portion 31, a round bar portion 32, and the lead portion 33. The round bar portion 32 and the lead portion 33 are coupled through a welding portion 34. The reduced portion 31 and the round bar portion 32 are composed of a material as same as that of the anode foil 21. An oxide layer may be formed on a surface of the reduced portion 31 and the round bar portion 32 with a chemical conversion treatment, as is case of the anode foil 21. An insulating resin such as polyimide may be coated on the surface of the reduced portion 31 and the round bar portion 32. In the embodiment, the reduced portion 31 and the round bar portion 32 are composed of aluminum of which surface is subjected to a chemical conversion treatment. The lead portion 33 is composed of a copper wire of which surface is subjected to a tinned treatment.

The reduced portion 31 has a stopper 35 and a connector 36 in order from the round bar portion 32 side. The stopper 35 is positioned between the sealing material 11 and the capacitor element 20, in the capacitor 100. The stopper 35 has a width larger than a diameter of the round bar portion 32, as shown in FIG. 2D. In this case, it is possible to restrain the contact of the sealing material 11 and the capacitor element 20, even if the sealing material 11 expands because of a thermal load. It is therefore possible to restrain that a defect is formed in the dielectric oxide layer at the edge portion of the anode foil 21. The connector 36 has a plate shape. The anode terminal 30 is coupled to the anode foil 21 through the connector 36.

The width of the stopper 35 is, preferably, more than 1.2 times of the diameter of the round bar portion 32. The thickness of the stopper 35 is, preferably, 2.5 times of that of the connector 36. In this case, it is possible to fabricate the capacitor 100 stably. It is possible to limit an influence of the increase of the inner pressure caused by the vaporization of the remaining solvent. And it is possible to restrain the contact of the sealing material 11 and the capacitor element 20 caused by the expansion of the sealing material 11. In addition, it is possible to form the stopper 35 by reducing a part of the round bar portion 32. It is possible to form the connector 36 by reducing a part of the stopper 35.

The cathode terminal 40 has a structure as same as that of the anode terminal 30. In the embodiment, the reduced portion 31 and the round bar portion 32 of the cathode terminal 40 are composed of aluminum of which surface is subjected to the chemical conversion treatment. The lead portion 33 of the cathode terminal 40 is composed of a copper wire of which surface is subjected to a tinned treatment.

Figure 3A:
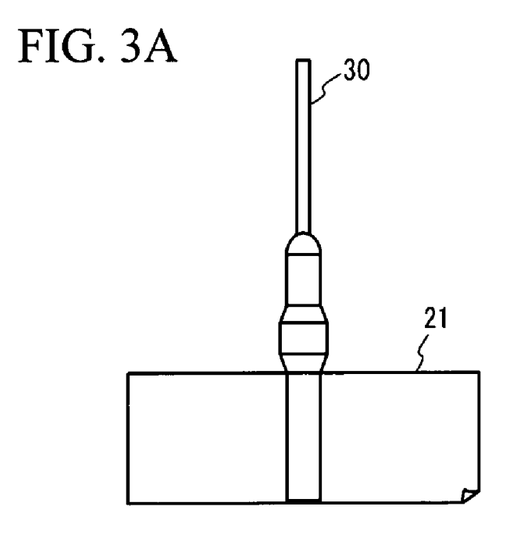
FIG. 3A through FIG. 3D illustrate a manufacturing flow of the capacitor in accordance with the first embodiment.
Figure 3B:
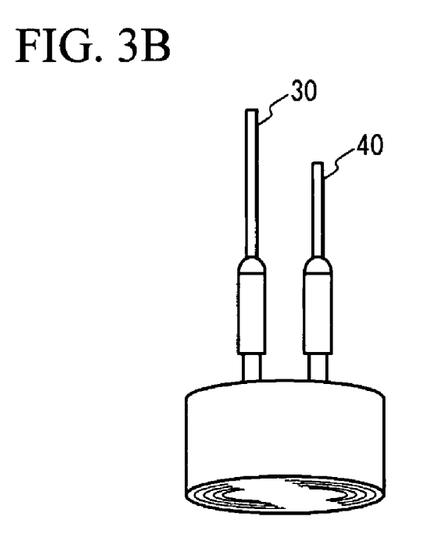
Figure 3C:
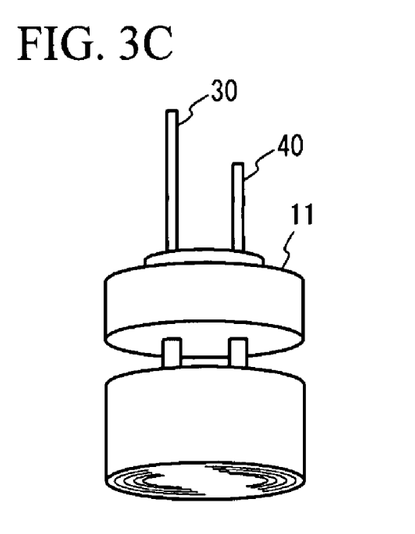

Next, a description will be given of a manufacturing method of the capacitor 100. FIG. 3A through FIG. 3D and FIG. 4A through FIG. 4C illustrate a manufacturing flow of the capacitor 100. As shown in FIG. 3A, the connector 36 of the anode terminal 30 is coupled to the anode foil 21. The connector 36 of the cathode terminal 40 is coupled to the cathode foil 22. In this case, it is possible to use an ultra sonic welding method, a resistance welding method, a caulking press method or the like. In the embodiment, the caulking press method is used. In this case, more metallurgical bonds are formed between the connector and the electrode foil. And the connector and the electrode foil are strong against an external force loaded in the rolling. It is therefore possible to limit a resistance change. Next, as shown in FIG. 3B, the anode foil 21, the cathode foil 22 and the separator 23 are rolled together, the separator 23 being between the anode foil 21 and the cathode foil 22. Then, as shown in FIG. 3C, the round bar portion 32 of the anode terminal 30 and the cathode terminal 40 are inserted into the through holes of the sealing material 11. And airspace is provided between the sealing material 11 and each electrode foil.

Figure 3D:
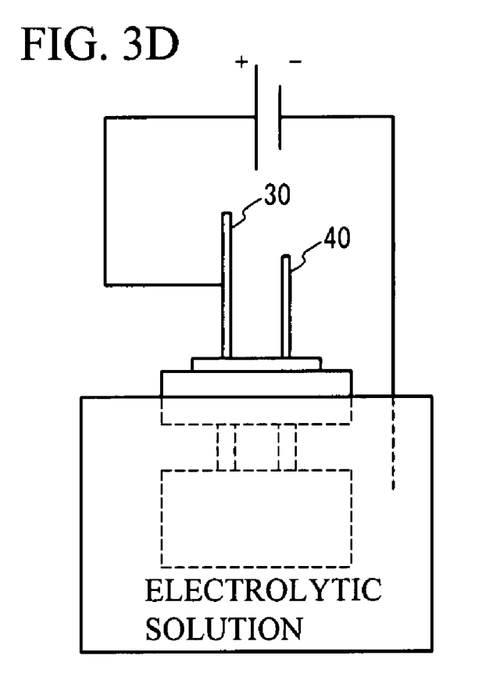

Next, as shown in FIG. 3D, the anode foil 21, the cathode foil 22, the anode terminal 30 and the cathode terminal 40 are energized in an electrolytic solution and are subjected to a chemical conversion treatment. A dissolved substance in the electrolytic solution is, for example phosphoric acid that is conductive in an aqueous solution. In the embodiment, ammonium adipate is used as the electrolytic solution. The chemical conversion treatment is carried out at a voltage near a formation voltage of a dielectric oxide layer, using chemical liquid mainly containing 0.5% to 2% ammonium adipate. After that, a thermal treatment is carried out and the chemical conversion treatment is carried out few times. It is therefore possible to form a strong dielectric oxide layer. The thermal treatment is carried out in temperature range 200 degrees C. to 320 degrees C. for few minutes to few tens of minutes.

An oxide layer is therefore formed on the valve metal exposed on an end surface (the edge portion) or on an exposed metal surface caused by a chip because of the terminal connection of the anode foil 21. And it is possible to put the anode terminal 30 in the electrolytic solution sufficiently, because the airspace is provided between the sealing material 11 and the each electrode foil. It is therefore possible to form the oxide layer on the surface of the anode terminal 30 sufficiently. Accordingly, it is possible to limit the increase of the leakage current of the capacitor 100.

In the chemical conversion treatment, an oxide layer is formed on the surface of the cathode foil 22 and the cathode terminal 40. The insulation property of the cathode foil 22 and the cathode terminal 40 is, however, independent of the leakage current of the capacitor 100. Therefore, the oxide layer may not be formed on the surface of the cathode foil 22 and the cathode terminal 40.

Figure 4A:
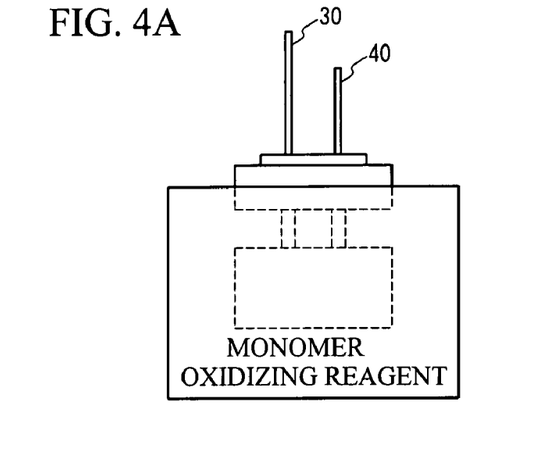
FIG. 4A through FIG. 4C illustrate a manufacturing flow of the capacitor in accordance with the first embodiment.

Next, as shown in FIG. 4A, polymerizable monomers and an oxidizing reagent are impregnated into the separator 23, and the electrolyte layer 24 is formed. The electrolyte layer 24 is composed of a conductive polymer of polyethylene dioxythiophene. It is possible to form the conductive polymer by polymerizing polymerizable polymer such as 3,4-ethylene dioxythiophene with use of an oxidizing reagent.

Instead of the polymerizable monomer, a monomer solution, in which the polymerizable monomer and a volatility liquid solution are blended at a ratio 1:1 to 1:3, can be used. The volatility liquid may be hydrocarbon such as pentane, ether such as tetrahydrofuran, ester such as ethyl formate, ketone such as acetone, alcohol such as methanol, nitrogen compound such as acetonitrile, a mixture thereof. It is preferred to use methanol, ethanol or acetone.

It is possible to use ferric p-toluene sulfonate, a mixture of ferric p-toluene sulfonate and ferric dodecylbenzenesulfonate, or a mixture of ferric p-toluene sulfonate and ferric methoxybenzenesulfonate or the like that are dissolved in a solvent and are suitable for formation of a polymer having high conductivity, as the oxidizing reagent. In particular, in a case where a mixed oxidizing reagent like the latter two examples is used, dopants in the polymer is stabilized and the heat resistance is stabilized. It is preferable to use butanol or a mixture of butanol and alcohol having more than one carbon as the solvent mentioned above. In this case, oxidizing reagent elements are dispersed and polymerization reaction of the polymerizable monomer is promoted. And it is possible to shorten polymerization time.

The ratio of the solvent mentioned above and the acid ferric may be optional. It is preferable to use a liquid solution containing 40% to 70% of the acid ferric by weight. In this case, the concentration of the oxidizing reagent is high. And a polymer that is denser and has a high yield point, is formed through the polymerization reaction of the polymerizable monomer mentioned above. The conducting polymer therefore excels in conductivity. And it is possible to reduce the ESR. In addition, preferably the compounding ratio of the polymerizable monomer and the oxidizing reagent is 1:3 to 1:6.

After the polymerization, the capacitor element 20 is subjected to a thermal treatment. The thermal treatment is carried out in a temperature of 240 degrees C. to 320 degrees C. for 3 minutes to 20 minutes. In this case, it is possible to eliminate the monomer, the oxidizing reagent, and the solvent dissolving the monomer and the oxidizing reagent not used in the polymerizing reaction. It is therefore possible to limit the increase of the inner pressure caused by the vaporization of the solvent or the like. Accordingly, it is possible to limit the deformation of the metal case 10 and the sealing material 11.

Figure 4B:
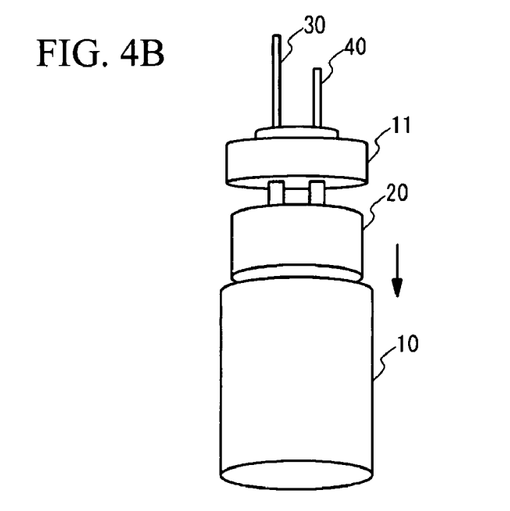
Figure 4C:
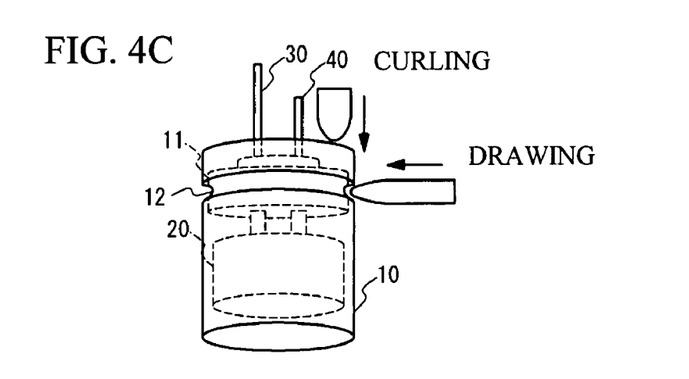

Next, as shown in FIG. 4B, the capacitor element 20 is packaged in the metal case 10. Then, as shown in FIG. 4C, the opening of the metal case 10 is filled with the sealing material 11. The opening of the metal case 10 is subjected to a drawing process and a curling process. And the concave portion 12 is formed. In this case, a pressure is not applied to the capacitor element 20, because airspace is provided between the sealing material 11 and the capacitor element 20. It is therefore possible to restrain a break of the chemically treated layer of the anode foil 21. Through the processes, the capacitor 100 is fabricated.

There is a case where the capacitor 100 is subjected to a heat of more than 200 degrees C. as in the case of soldering reflow for few seconds to few minutes. The dielectric oxide layer is, however, formed on the upper portion of the capacitor element 20, the reduced portion 31 of the anode terminal 30 and the round bar portion 32 in the re-chemical conversion treatment. It is therefore possible to limit the leakage current even if the inner pressure is increased. The capacitor element 20 is subjected to a given voltage treatment at 120 degrees C. to 180 degrees C. If necessary, the lead portion 33 is processed, and the capacitor 100 is fabricated. For example, the lead portion 33 may be pressed and may be subjected to a bending process after a board is inserted, when the capacitor 100 is surface-mounted.

In the embodiment, the metal case 10 corresponds to the packaging material. The round bar portion 32 corresponds to the first material. The connector 36 corresponds to the second material. The concave portion 12 corresponds to the first concave portion.

Second Embodiment

Figure 5:
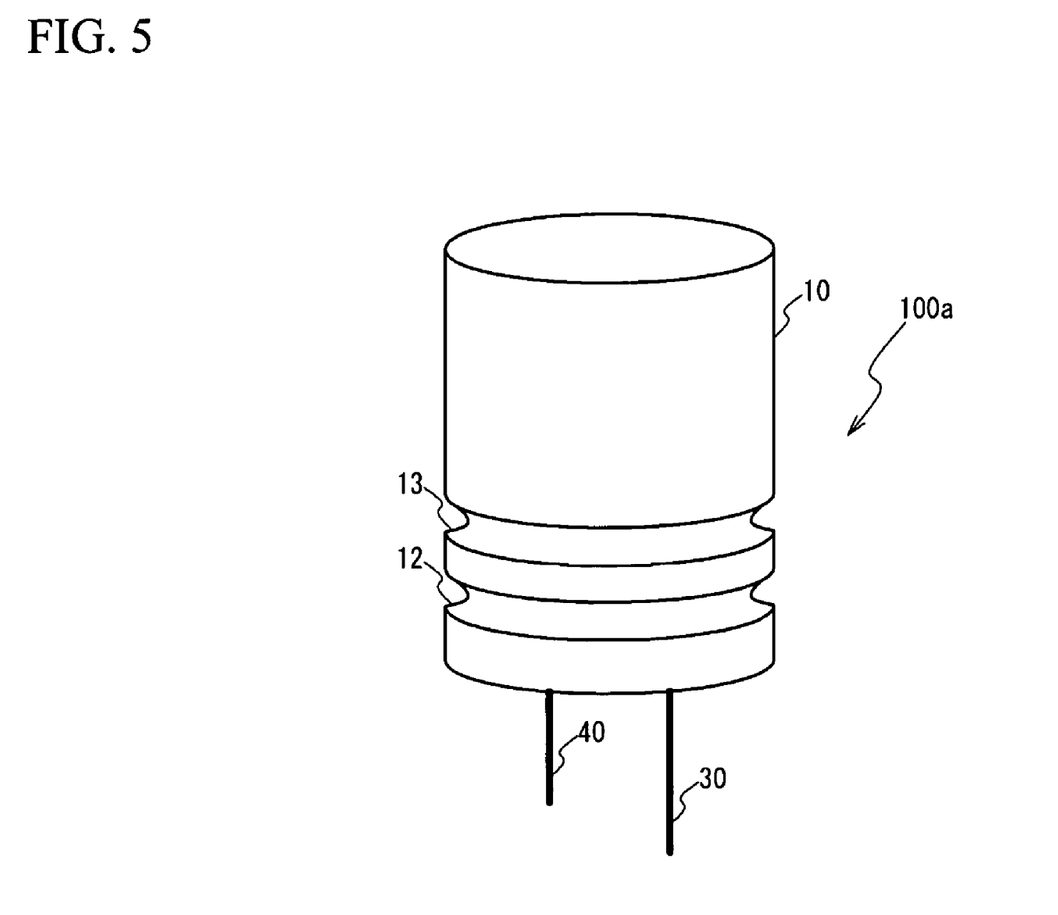
FIG. 5 illustrates an external view of a capacitor in accordance with a second embodiment of the present invention.
Figure 6A:
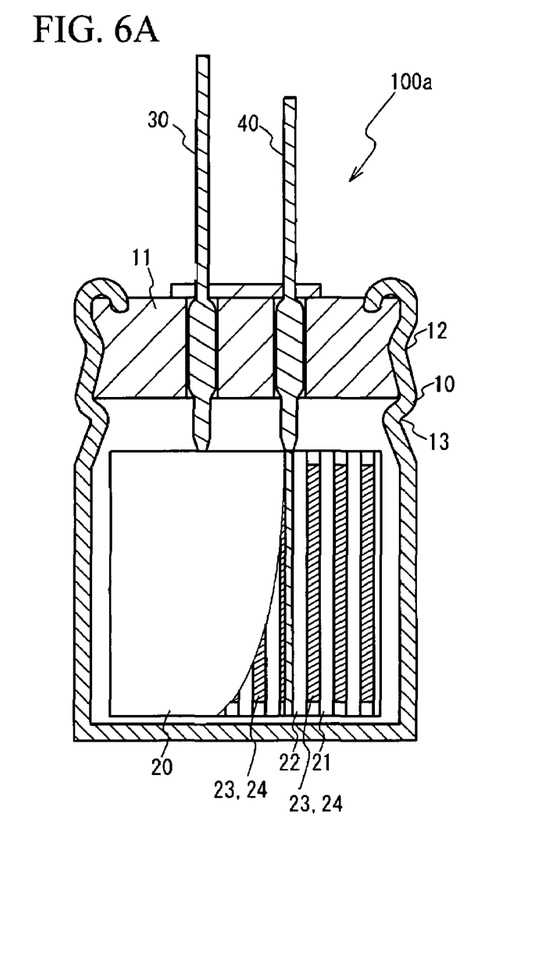
FIG. 6A and FIG. 6B illustrate a partially cutout cross sectional view of the capacitor in accordance with the second embodiment.
Figure 6B:
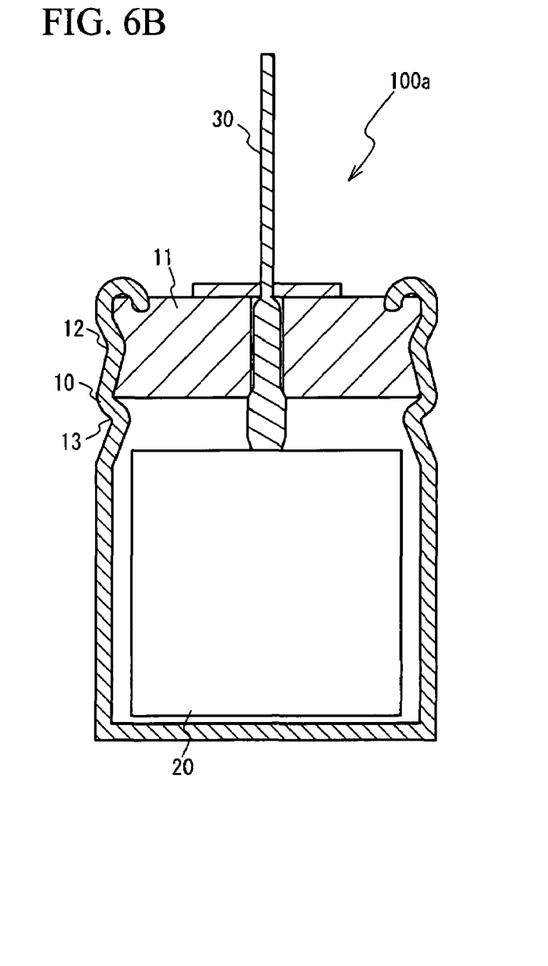

FIG. 5 illustrates an external view of a capacitor 100a in accordance with a second embodiment of the present invention. As shown in FIG. 5, a concave portion 13 is formed along the circumference near the opening of the metal case 10. FIG. 6A and FIG. 6B illustrate a partially cutout cross sectional view of the capacitor 10a. FIG. 6A illustrates is a front view of the capacitor 100a. FIG. 6B illustrates a side view of the capacitor 100a. As shown in FIG. 6A and FIG. 6B, the capacitor 100a has the concave portion 13 between the sealing material 11 and the capacitor element 20 on the metal case 10, being different from the capacitor 100 in FIG. 1A and FIG. 1B.

In this case, the sealing material 11 is fixed by the concave portion 12 and the concave portion 13. It is therefore possible to restrain the contact of the sealing material 11 and the capacitor element 20 effectively, even if the sealing material 11 expands because of a thermal load. It is therefore possible to effectively restrain that a defect is formed in the dielectric oxide layer at the edge portion of the anode foil 21 and the cathode foil 22. And it is possible to restrain the deformation of the sealing material 11 effectively.

Figure 7A:
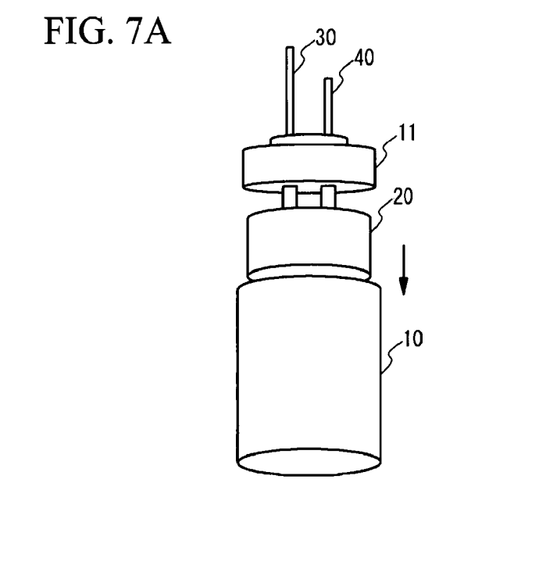
FIG. 7A through FIG. 7C illustrate a manufacturing flow of the capacitor in accordance with the second embodiment.
Figure 7B:
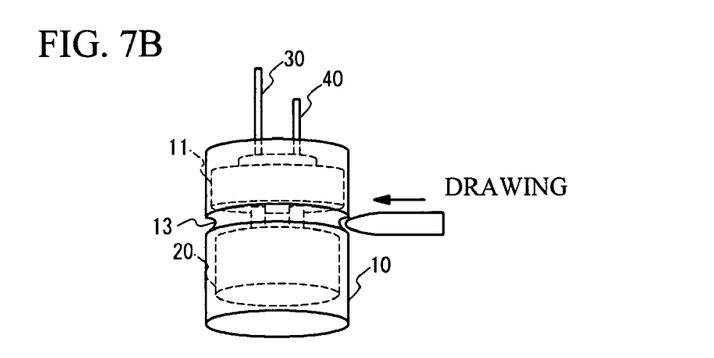
Figure 7C:
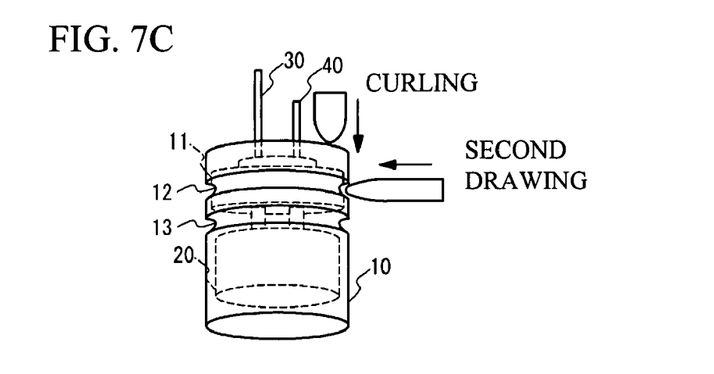

Next, a description will be given of a manufacturing method of the capacitor 100a. FIG. 7A through FIG. 7C illustrate a manufacturing flow of the capacitor 100a. The capacitor element 20 is fabricated through the processes shown in FIG. 3A through FIG. 3C and FIG. 4A. Next, the capacitor element 20 is packaged in the metal case 10 as shown in FIG. 7A. Then, as shown in FIG. 7B, the opening of the metal case 10 is filled with the sealing material 11. A part of the metal case 10 between the sealing material 11 and the capacitor element 20 is subjected to a drawing process. The concave portion 13 is thus formed. In this case, a pressure is not applied to the capacitor element 20, because airspace is provided between the sealing material 11 and the capacitor element 20. It is therefore possible to restrain a break of the chemically treated layer of the anode foil 21 and the cathode foil 22.

Next, a part of the metal case 10, where the sealing material 11 is provided, is subjected to a drawing process and a curling process as shown in FIG. 7C. The concave portion 12 is thus formed. In this case, the sealing material 11 is fixed by the concave portion 12. Through the processes mentioned above, the capacitor 100a is fabricated.

Figure 8A:
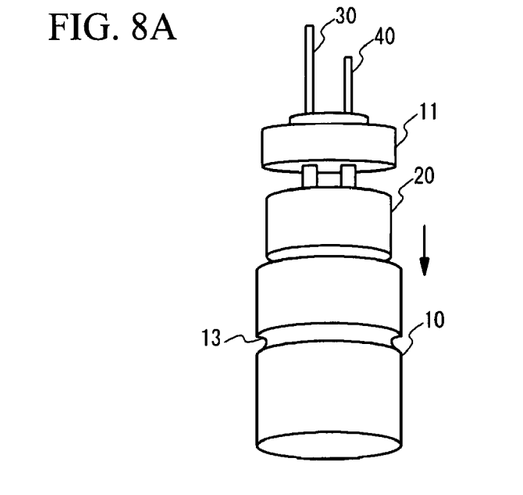
FIG. 8A through FIG. 8C illustrate another manufacturing flow of the capacitor in accordance with the second embodiment.
Figure 8B:
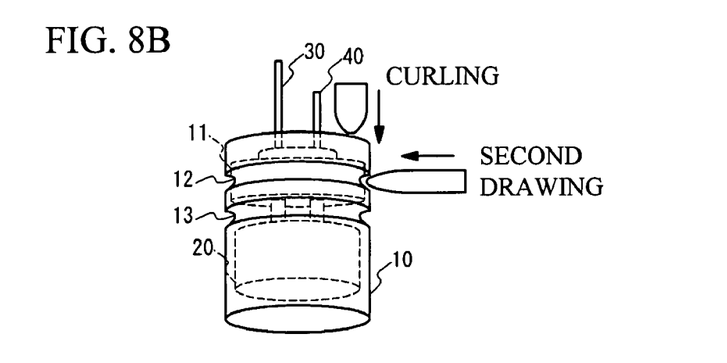
Figure 8C:
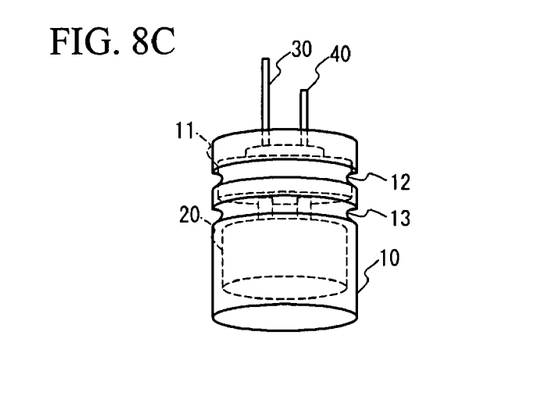

FIG. 8A through FIG. 8C illustrate another manufacturing flow of the capacitor 100a. The capacitor element 20 is fabricated through the processes shown in FIG. 3A through FIG. 3C and FIG. 4A. Next, the capacitor element 20 is packaged in the metal case 10 as shown in FIG. 8A. The concave portion 12 is formed on the metal case 10 through a drawing process in advance. Then, as shown in FIG. 8B, the opening of the metal case 10 is filled with the sealing material 11. The opening of the metal case 10 is subjected to a drawing process and a curling process. The concave portion 12 is thus formed. In this case, a pressure is not applied to the capacitor element 20, because airspace is provided between the sealing material 11 and the capacitor element 20. It is therefore possible to restrain a break of the chemically treated layer of the anode foil 21 and the cathode foil 22. Through the processes mentioned above, the capacitor 100a is fabricated.

In the embodiment, the concave portion 13 corresponds to the second concave portion.

EXAMPLES

Example

In an example, the capacitor 100 shown in FIG. 1 was manufactured. Aluminum foil, which was subjected to an etching treatment and a chemical conversion treatment, was used as the anode foil 21 and the cathode foil 22. A copper material subjected to a tinned treatment was used as the lead portion 33 of the anode terminal 30 and the cathode terminal 40. Aluminum was used as the reduced portion 31 and the round bar portion 32 of the anode terminal 30 and the cathode terminal 40. An electrolytic paper mainly composed of a manila hemp was used as the separator 23. Aluminum having a resin coated on both faces thereof was used as the metal case 10. The IIR was used as the sealing material 11. The normal rated voltage of the capacitor in accordance with the example is 2.5 WV.

At first, the capacitor element 20 was fabricated. The anode foil 21 is coupled to the anode terminal 30, and the cathode foil 22 was coupled to the cathode terminal 40 by a caulking press method. After that, the anode foil 21, the cathode foil 22 and the separator 23 were rolled together, the separator being between the anode foil 21 and the cathode foil 22. Each round bar portion 32 of the anode terminal 30 and the cathode terminal 40 was inserted to each of the through holes of the sealing material 11. And the anode terminal 30 and the cathode terminal 40 were attached to the capacitor element 20.

The anode foil 21, the cathode foil 22, and each reduced portion 31 of the anode terminal 30 and the cathode terminal 40 were subjected to a chemical conversion treatment at a voltage near a formation voltage of the oxide layer of the anode foil 21 using chemical liquid mainly containing 0.5% to 2% ammonium adipate by weight, and were subjected to a thermal treatment in a temperature range 200 degrees C. to 320 degrees C. for 3 minutes to 20 minutes. The chemical conversion treatment and the thermal treatment were repeated 3 times to 7 times. The foils and the reduced portions were cleaned with purified water for more than 5 minutes, and were dried in an atmosphere of more than 100 degrees C. for 30 minutes to 90 minutes.

Next, the electrolyte layer 24 was formed. 3,4-ethylene dioxythiophene and 1-butanol solution containing ferric p-toluene sulfonate were impregnated into the separator 23. The separator 23 was kept 16 hours in the atmosphere in temperature range 40 degrees C. to 150 degrees C. The conductive polymer layer formed of polyethylene dioxythiophene was formed and the electrolyte layer 24 was formed. Next, the capacitor element 20 was subjected to a thermal treatment in a temperature range 240 degrees C. to 320 degrees C. for 3 minutes to 20 minutes. The capacitor element 20 was packaged in the metal case 10. The metal case 10 was subjected to a drawing process. The metal case 10 was thus closed. After that, an aging treatment was carried out in an atmosphere of more than 125 degrees C. at more than 2.5 V. The capacitor 100 having 8 mm diameter and 11.5 mm length was fabricated.

Comparative Example

In a comparative example, a capacitor not having airspace between the capacitor element 20 and the sealing material 11 was fabricated. At first, the anode foil 21, the cathode foil 22 and the separator 23 were rolled together, the separator 23 being between the anode foil 21 and the cathode foil 22. The sealing material 11 was compressed to the top face of the capacitor element 20. The chemical conversion treatment was repeated. Other material and other processes were as same as those of the capacitor in accordance with the example mentioned above. The normal rated voltage of the capacitor in accordance with the comparative example is 2.5 WV.

(Analysis)

Table 1 shows an electrical capacitance at 120 Hz frequency, the tan δ, the ESR at 100 kHz frequency, the leakage current after energization of normal rated voltage two minutes of the capacitor in accordance with the example and the comparative example. Fifty capacitors in accordance with the example and the comparative example were fabricated, and each value in Table 1 shows average value thereof.

TABLE 1

|  | Electrical capacitance (μF) | tan δ (—) | ESR (mΩ) | Leakage current (μA/2 minutes) |
|---|---|---|---|---|
| Example | Ave 558.3 σ 27.7 | Ave 0.011 σ 0.004 | Ave 5.7 σ 0.55 | Ave 4.23 σ 5.85 |
| Comparative example | Ave 560.2 σ 29.1 | Ave 0.010 σ 0.004 | Ave 5.5 σ 0.85 | Ave 31.4 σ 124.0 |

As shown in Table 1, there was little difference between each electrical capacitance, between each tan δ and between each ESR. The dispersion and the average of the leakage current of the capacitor in accordance with the example were reduced considerably, compared to those of the capacitor in accordance with the comparative example.

Airspace was provided between the sealing material 11 and the capacitor element 20 in the capacitor in accordance with the example, being different from the capacitor in accordance with the comparative example. And the electrolytic solution was provided to the reduced portion 31 and the round bar portion 32 sufficiently in the chemical conversion treatment. A strong dielectric oxide layer was formed on the surface of the reduced portion 31 and the round bar portion 32. It is thought that the insulation property when a voltage was applied to the capacitor 100 was improved and accordingly the leakage current was reduced.

Next, property change caused by a thermal load was measured. In detail, the capacitors in accordance with the example and the comparative example were impregnated into a solder bath (at 240 degrees C. for 90 seconds). The external views were measured and the leakage current after energization of normal rated voltage two minutes was measured. The results are shown in Table 2. Average values of fifty capacitors in accordance with the example and the comparative example are shown in Table 2. And external conditions after examination, average value Ave of the leakage currents, and dispersion σ thereof are shown in Table 2.

TABLE 2

|  | External condition after thermal load | Leakage current (μA/2 minutes) |
|---|---|---|
| Example | External deformation is not remarkable. 50/50 | Ave 20.23 σ 16.85 |
| Comparative example | Center of sealing member is expanded a little. 6/50 External deformation is not remarkable. 44/50 | Ave 470.8 σ 166.7 |

As shown in Table 2, an increasing amount of the leakage current of the capacitor in accordance with the example was reduced, compared to the capacitor in accordance with the comparative example. The shape of the capacitor in accordance with the example was not changed remarkably after the thermal load, compared to the capacitor in accordance with the comparative example.

The inner pressure of the metal case 10 was increased during the thermal load, because of the vaporization of the unreacted oxidizing reagent, the monomer, and the remaining solvent in the electrolyte. In the capacitor in accordance with the comparative example, the capacitor element 20 was stressed by the deformation of the sealing material 11 in addition to the increase of the inner pressure. Therefore, it is thought that the oxide layer on the edge of the anode foil 21 and the cathode foil 22 was broken, a defect was formed, and the leakage current was accordingly increased.

In the capacitor in accordance with the example, the airspace was provided in the metal case 10. And the vapor was absorbed in the airspace after the inner pressure was increased. Therefore, it is thought that the leakage current was not increased. And it is supposed that it is one of the reasons that the deformation of the sealing material 11 was limited because the sealing material 11 was held by the concave portion 12 and the reduced portion 31 in a substantially equal strength.

As mentioned above, the initial leakage current was reduced in the capacitor in accordance with the example. And the increasing of the leakage current and the shape change were limited.

While the preferred embodiments of the prevent invention have been illustrated in detail, the invention is not limited to the specific embodiments above. In addition, it will be appreciated that the invention is susceptible of modification, variation and change without departing from the proper and fair meaning of the accompanying claims.

The present invention is based on Japanese Patent Application No. 2006-005440 filed on Jan. 12, 2006, the entire disclosure of which is hereby incorporated by reference.

What is claimed is:

1. A capacitor comprising:
a capacitor element having an anode foil coupled to an anode terminal, a cathode foil coupled to a cathode terminal, a separator, and an electrolyte layer,
the anode foil, the cathode foil and the separator being rolled together,
the separator being between the anode foil and the cathode foil,
the electrolyte layer being formed between the anode foil and the cathode foil;
a packaging material that has an opening and packages the capacitor element; and
a sealing material that has a through hole where the anode terminal and the cathode terminal pass through and that seals the opening of the packaging material,
wherein:
a given space is provided between the sealing material and the capacitor element;
at least one of the anode terminal and the cathode terminal has a lead portion, a first material, a second material and a stopper,
the first material has a diameter larger than that of the lead portion, is connected to the lead portion and passes through the through hole of the sealing material, and
the second material is coupled to the capacitor element, and the stopper is provided between the first material and the second material and has a width larger than the diameter of the first material.

2. The capacitor as claimed in claim 1, wherein:
the first material has a round bar shape; and
the stopper has a plate shape having the width larger than the diameter of the first material.

3. The capacitor as claimed in claim 2,
wherein:
the anode foil, the first material, the second material and the stopper have an oxide layer formed on a surface thereof; and
the cathode foil has an oxide layer, a valve metal or a carbon material on a surface thereof.

4. The capacitor as claimed in claim 1,
wherein:
the packaging material has a first concave portion near the opening; and the sealing material is held by the first concave portion.

5. The capacitor as claimed in claim 4 wherein the packaging material has a second concave portion between the sealing material and the capacitor element.

6. The capacitor as claimed in claim 1, wherein the sealing material is composed of a rubber.

7. A manufacturing method of a capacitor comprising:
rolling an anode foil coupled to an anode terminal, a cathode foil coupled to a cathode terminal and a separator together,
the separator being between the anode foil and the cathode foil;
inserting the anode terminal and the cathode terminal into a sealing material;
providing a given space between the sealing material and the anode and the cathode terminals;
subjecting the anode terminal, the anode foil, the cathode terminal and the cathode foil to a chemical conversion treatment;
forming an electrolyte layer between the anode foil and the cathode foil and thus fabricating the capacitor element;
packaging the capacitor element in a packaging material having an opening; and
sealing the opening with the sealing material,
wherein at least one of the anode terminal and the cathode terminal has a lead portion, a first material, a second material and a stopper,
the first material has a diameter larger than that of the lead portion, is connected to the lead portion and passes through the through hole of the sealing material,
the second material is coupled to the capacitor element, and
the stopper is provided between the first material and the second material and has a width larger than the diameter of the first material.

8. The method as claimed in claim 7 further comprising subjecting a part of the packaging material holding the sealing material to a drawing process and a curling process.

9. The method as claimed in claim 7 further comprising subjecting a part of the packaging material between the sealing material and the capacitor element to a drawing process.

10. The method as claimed in claim 7 wherein the sealing material is composed of a rubber.

* * * * *